Oct. 20, 1925.
H. L. DE ZENG
1,558,249
ARTIFICIAL LURE
Filed Oct. 27, 1923
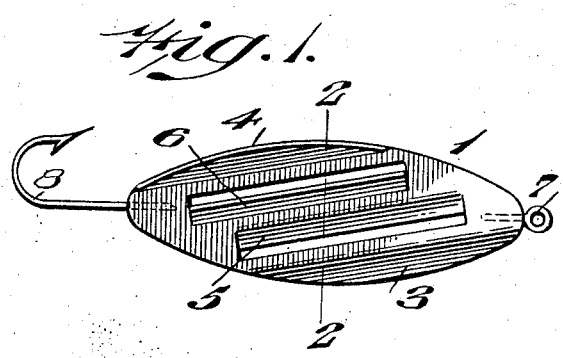
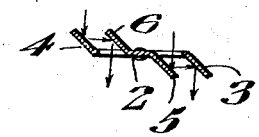
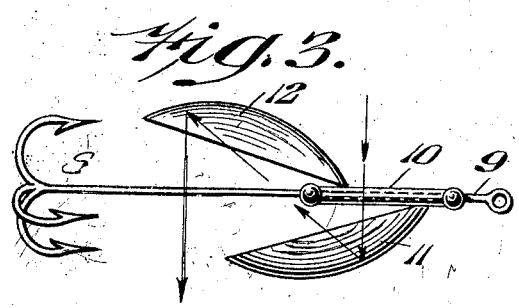
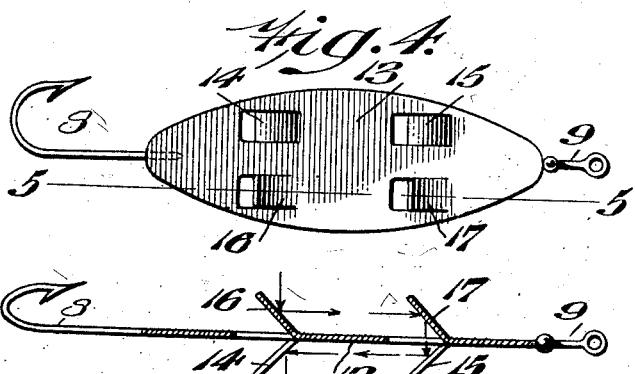
INVENTOR:
Henry L. De Zeng,
BY
Wiedersheim & Fairbanks,
ATTORNEYS.

Patented Oct. 20, 1925.

1,558,249

UNITED STATES PATENT OFFICE.

HENRY L. DE ZENG, OF MOORESTOWN, NEW JERSEY.

ARTIFICIAL LURE.

Application filed October 27, 1923. Serial No. 671,074.

*To all whom it may concern:*

Be it known that I, HENRY L. DE ZENG, a citizen of the United States, residing at Moorestown, county of Burlington, State of New Jersey, have invented a new and useful Artificial Lure, of which the following is a specification.

My present invention comprehends a novel construction and arrangement of an artificial lure wherein the underside of the lure will reflect light so that fish which are beneath the lure will be attracted by it.

In devices of this character, as heretofore made, the illumination of the lure is brought about by the light passing through the water to the top of the lure and no provision has been made for having the light reflected by the underside of the lure.

The lure would preferably but not necessarily be in the form of a trolling bait which might or might not be free to revolve.

The means employed for causing the underside of the lure to reflect light may vary widely in practice and many different forms of construction may be employed to accomplish this result.

For the purpose of illustrating my invention, I have shown in the accompanying drawing a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a plan view of a lure, embodying my invention.

Figure 2 represents a cross section on line 2—2 of Figure 1 but showing in addition the manner in which the light rays are reflected.

Figure 3 represents a side elevation of another embodiment of my invention.

Figure 4 represents a plan view of another embodiment of my invention.

Figure 5 represents a section on line 5—5 of Figure 4.

Similar numerals of reference indicate corresponding parts.

Referring to the drawings.

1 designates an artificial lure, embodying my invention.

Referring first to the construction seen in Figures 1 and 2, the lure 1 is formed from a strip of sheet material or it may be molded or pressed into the desired form.

In Figures 1 and 2, the body portion of the lure is formed by a strip of material 2 which forms the body portion and, as illustrated, is elliptically shaped, although the exterior contour may be varied as desired.

Opposite marginal portions of the body portion are deflected in opposite directions, as indicated at 3 and 4, and the body portion is slit to provide the oppositely deflected reflector members 5 and 6. It will be understood that both sides of the body portion are polished or otherwise treated to form a reflecting surface.

It will be seen from Figure 2 that the daylight or light rays from above will strike the reflecting member 4 and be directed to the reflector 6 and from such reflector downwardly, and, in a similar manner, the light rays will strike the reflector 5 on the opposite side of the spoon and pass to the reflector 3, which latter will cause them to be directed downwardly, so that the underside of the two reflecting members 3 and 6 will flash the light downwardly to attract the attention of the fish. The body portion 2 is provided with an eyelet or other means 7 to which the fishing line or swivel is adapted to be attached. The hook 8 is connected to the lure in any desired manner and in all the embodiments shown may consist of one or more hooks or the hooks may be omitted.

In the embodiment seen in Figure 3, I am enabled to obtain similar results to those above described. In this embodiment, the shank 9 of the hook has rotatably mounted thereon a rotatable sleeve 10 to which two opposed members or auxiliary spoons 11 and 12 are permanently attached.

Both sides of the auxiliary spoons 11 and 12 form reflecting surfaces. The light rays pass to the inner face of the spoon 11 and are reflected to the inner face of the spoon 12 which latter deflects the rays downwardly or which in reverse order will cause the light rays to pass from the inner surface of the spoon 12 to the inner surface of the spoon 11, so that in any position a spoon may assume, light rays will be deflected downwardly when either spoon is upwardly.

It will be apparent that these spoons during their revolution will cause the light rays to be flashed in many directions. Due to the arrangement of the spoons, they will revolve about the shank of the hook or its equivalent when drawn through the water.

It will be understood that in Figures 1 and 2, the reflectors are arranged diagonally so that they effect the revolution of the lure when it is drawn through the water.

In the construction seen in Figures 4 and 5, I have shown another embodiment of my invention wherein the light rays are reflected approximately longitudinally of the lure, it being apparent that it is immaterial in the broad spirit of my invention as to how these light rays pass so long as light rays are deflected downwardly.

In this embodiment, 13 designates the lure which may be formed from sheet material or molded to its final contour. On one side of its spinning center or longitudinal axis a plurality of reflecting fins 14 and 15 are formed by slitting the material and pressing these fins outwardly. On the opposite side of the spinning center, similar fins 16 and 17 are formed which form reflectors but extend outwardly from the opposite face of the lure. These reflecting fins effect the rotation of the lure when drawn through the water. They also cause light rays to be intermittently reflected downwardly and in many directions during the revolution of the lure.

In all other types of lures or fishing baits with which I am familiar, which are provided with reflecting surfaces for attracting the attention of the fish, the light is reflected only in meridians above the horizontal plane of the lure, and, in consequence, fish lying below the plane of the lure are not attracted by it and however bright the reflecting surface of the lure may be, it cannot flash light below its horizontal plane. It is therefore obvious that the lure does not attract the fish lying near or upon the bottom of the water in which the lure is being used.

In my invention, the undersurface of the lure is illuminated by reason of the reflecting surfaces which flash the light downwardly and laterally over a wide area as it revolves in being drawn through the water. It is therefore extremely effective and is in so far as I am aware, the first light reflecting lure which is capable of directing light rays from above into and through meridians lying below and to lateral sides of the plane in which the lure is being employed.

I am also the first in the art in so far as I am aware to devise a lure wherein the light rays pass through the lure in the act of directing light to meridians below the axis of the lure.

In substance, my invention consists of a system of novelly arranged reflecting surfaces whereby incident light from above is directed through meridians below the plane of the axis of the lure.

Having thus described my invention, what I claim as new and desire to secure by Letters Patent, is:—

1. In an artificial lure, a body portion, and a pair of revolving members, said members being located in pre-determined fixed relationship with respect to each other, the upper surface of one member being adapted to reflect light to the under surface of the other member alternately as said members are caused to revolve on moving the lure through the water horizontally.

2. In an artificial lure, a body portion, a hook, and a multiple system of reflectors, said reflectors being angularly disposed to said body portion and so inter-related as to reflect incident light from above the plane of the lure when in approximately horizontal position; downwardly into meridians lying below the plane of the lure.

3. An artificial lure, having a plurality of angularly disposed reflecting surfaces revolvable about the axis of said lure, said reflecting surfaces being so inter-related with respect to each other that light falling upon one member of the plurality of surfaces from above will be directed to the other member of the pair and then downwardly when the lure is in approximately horizontal position.

HENRY L. DE ZENG.